(12) United States Patent
Gorzynski

(10) Patent No.: US 7,889,225 B2
(45) Date of Patent: Feb. 15, 2011

(54) VIDEOCONFERENCING ENVIRONMENT

(75) Inventor: Mark E. Gorzynski, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1252 days.

(21) Appl. No.: 11/484,898

(22) Filed: Jul. 12, 2006

(65) Prior Publication Data

US 2008/0036850 A1   Feb. 14, 2008

(51) Int. Cl.
H04N 7/14 (2006.01)
(52) U.S. Cl. .............. 348/14.08; 348/14.09; 348/14.12; 52/56.2
(58) Field of Classification Search ... 348/14.01–14.16; 52/56.2, 27.5, 79.1; 379/453; 312/233.3
See application file for complete search history.

(56) References Cited

U.S. PATENT DOCUMENTS

| | | | |
|---|---|---|---|
| 5,572,248 A | 11/1996 | Allen et al. | |
| 5,751,337 A | 5/1998 | Allen et al. | |
| 6,046,767 A | 4/2000 | Smith | |
| 6,160,573 A | 12/2000 | Allen et al. | |
| 6,205,716 B1 * | 3/2001 | Peltz | 52/36.2 |
| 6,292,211 B1 * | 9/2001 | Pena | 348/14.08 |
| 6,445,405 B1 | 9/2002 | Allen et al. | |
| 6,654,045 B2 | 11/2003 | Allen et al. | |
| 6,844,893 B1 * | 1/2005 | Miller et al. | 348/14.1 |
| 6,930,702 B1 | 8/2005 | Ferren et al. | |
| 7,269,927 B2 * | 9/2007 | Savard | 52/506.06 |
| 2002/0149672 A1 | 10/2002 | Clapp et al. | |
| 2004/0003545 A1 | 1/2004 | Gillespie | |
| 2005/0024484 A1 | 2/2005 | Leonard et al. | |
| 2007/0263081 A1 * | 11/2007 | De Beer et al. | 348/14.08 |

FOREIGN PATENT DOCUMENTS

JP     06141318 A   *   5/1994

OTHER PUBLICATIONS

Tandberg, "Videoconferencing Systems", available at http://www.tandberg.net/products/video_systems/index.jsp, (Viewed Jun. 7, 2006). 4 pages.
Pro AV Magazine, "Cheat Sheet: Optimizing a Videoconferencing Environment", available at http://proav.pubdyn.com, (Viewed Jun. 9, 2006). 2 pages.
France Telecom, "The telepresence wall which eradicates frontiers and distance", (2003). 4 pages.

* cited by examiner

Primary Examiner—Melur Ramakrishnaiah

(57) ABSTRACT

A method of videoconferencing includes arranging a portable environment to include a first wall generally parallel to and spaced from a second wall and facing a videocamera on the first wall toward the second wall. An on-camera subject zone is implemented between the first wall and the second wall via: (1) setting a field-of-view of the videocamera to include the second wall while excluding a peripheral edge of the second wall; and (2) positioning a subject station between the first wall and the second wall and setting the on-camera subject zone within a boundary defined by the field-of-view of the videocamera extending from the subject station to the second wall.

21 Claims, 5 Drawing Sheets

VIDEOCONFERENCING ENVIRONMENT

BACKGROUND

Videoconferencing debuted with great fanfare as the solution for people in different locations to communicate with each other without having to leave their homes or offices. Once sufficient communication speeds, processor power, and memory were available, capturing an audiovisual recording of one person and transmitting to another for viewing in real time became technologically feasible. However, users quickly experienced the unnatural perception created by conventional videoconferencing.

For instance, one type of conventional videoconferencing typically includes one or more bulky, portable wheeled carts with each cart including a viewing monitor, a videocamera, and recording/playback equipment, as well as lighting and other sound equipment. While these carts are easily moved, the participants of the videoconference are each acutely aware of the monitor, cart and associated equipment. This awareness, along with the visual impression created by this arrangement, produces an unnatural feel hindering the intended intimate communication between the participants in different locations. In addition, the room in which the video-cart is placed typically includes additional elements such as pictures, extraneous furniture, etc. that reminds the participants of their different locations and artificial environment.

In addition, some conventional permanent videoconferencing rooms attempt to create a natural feel by hiding a camera at eye-level or other locations while maximizing the viewing monitor to mimic an up-close feel of viewing the remote participants. Other conventional permanent videoconferencing rooms further attempt to create reciprocity between two remote video rooms by adding identical props such as plants, wall structures, etc. to each respective video-room in an attempt to create a natural feel.

Despite these attempts, conventional videoconferencing still suffers from a lack of realness that hinders participants from fully engaging in and from fully embracing the videoconference format.

DETAILED DESCRIPTION

Figure 1:
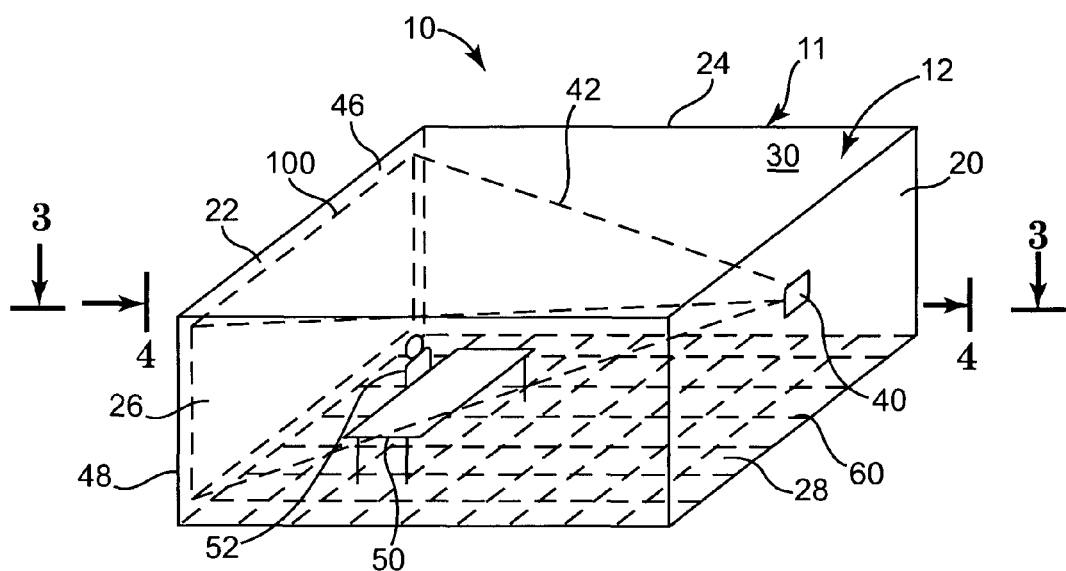
FIG. 1 is a perspective view of a videoconferencing environment, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to modular environments adapted to enhance videoconferencing. In one embodiment, a method for videoconferencing comprises arranging a portable environment to include a first wall generally parallel to and spaced from a second wall and facing a videocamera on the first wall toward the second wall. An on-camera subject zone is implemented between the first wall and the second wall via: (1) setting a field-of-view of the videocamera relative to a first distance between the first wall and the second wall and relative to a size and shape of the second wall to cause the field-of-view of the videocamera to include the second wall while excluding a peripheral edge of the second wall; and (2) positioning a subject station between the first wall and the second wall and setting the on-camera subject zone within a boundary defined by the field-of-view of the videocamera extending from the subject station to the second wall.

In one aspect, implementing the on-camera subject zone includes physically limiting movement of a subject to remain within the boundary of the on-camera subject zone and positioning the subject station adjacent a second distance from the first wall, the second distance corresponding to a minimum focal distance of the videocamera.

In another embodiment, the environment is arranged to substantially match a first aspect ratio parameter of the videocamera and a second aspect ratio parameter of the second wall. In another embodiment, the environment is arranged to define the second wall as a substantially homogeneous surface.

Embodiments of the invention create the impression of immediacy and transparency to the participants of the videoconference. In other words, the environment induces the participants to be less conscious of their surrounding environment-because the environment ensures that no objects or boundaries cross the field-of-view of the participant, thereby preventing such objects or boundaries from fracturing the participant's immediate impression of each other. Accordingly, the environment encourages participants to act as if they were both in the same place.

Embodiments of the invention are also portable and based on predetermined environment criterion so that the portable environments are consistently reproducible each time the portable environment is set up. In addition, the portable environments include several modular components making the set up and breakdown of the environment easy to perform. The reproducibility of the environments based on predetermined criterion also avoids time consuming tuning of audiovisual equipment in conventional videoconferencing systems that are installed in an existing room. Instead, with embodiments of the invention, the entire videoconferencing environment includes both the walls and the camera so that the videocamera and the walls are already tuned relative to each other prior to set up.

These embodiments of the invention, and additional embodiments of the invention, are described and illustrated throughout FIGS. 1-6.

FIG. 1 is a perspective view of a videoconferencing environment 10, according to one embodiment of the invention. As shown in FIG. 1, videoconferencing environment 10 comprises an enclosure 11 including an array 12 of walls 20, 22, 24, 26. In one embodiment, array 12 comprises front wall 20, back wall 22, side walls 24, 26. In one aspect, array 12 comprises only front wall 20 and back wall 22 while in another aspect, array 12 comprises front wall 20, back wall 22, and at least one of side walls 24, 26. In another aspect, walls 20, 22, 24, 26 of array 12 are removably attachable relative to one another to enable separation of the walls 20, 22, 24, 26 for transport to another location for later reassembly into enclosure 11. Accordingly, each wall 20, 22, 24, 26 comprises a module of videoconferencing environment 10 that is adapted for assembly into a completed enclosure 11.

In one embodiment, array 12 additionally comprises floor 28 and/or ceiling 30. In another embodiment a floor and a ceiling of an existing room in which the videoconferencing environment 10 is placed provides a "top" and a "bottom" to enclosure 11.

In one embodiment, videocamera 40 is mounted within or on front wall 20 and is configured to capture a viewable image within the enclosure 11 defined via field-of-view 42. In one aspect, enclosure 12 is sized and shaped so that field-of-view 42 of videocamera 40 at back wall 22 defines a viewable area 100 at back wall 22 that corresponds to substantially the entire surface area of back wall 22 but being sized slightly less than an entire surface area of back wall 22. This arrangement prevents any side edges or corners of enclosure 11 adjacent back wall 22 from appearing in the viewable area 100 (defined by field-of-view 42), as further described later in association with FIGS. 2-4. In one aspect, a border 46 is defined between viewable area 100 and a peripheral edge 48 of back wall 22 to ensure that the viewable area 100 within, and defined by the field-of-view 42 of videocamera 40, excludes the peripheral edge 48 of back wall 22.

In one embodiment, viewable area 100 comprises about 95 percent of the surface area of back wall 22 with border 46 comprising about 5 percent of the surface area of the back wall 22. In other embodiments, viewable area 100 comprises less than 95 percent of the surface area of back wall 22.

As further illustrated in FIG. 1, in one embodiment, environment 10 comprises table 50 adapted to host subject 52 and to position subject 52 within field-of-view 42. In one aspect, this table 50 acts as a subject station at which a subject 52 sits or stands. As further described later in association with FIGS. 2-4, table 50 defines one portion of a boundary of an on-camera subject zone (i.e., on-camera participant zone).

In one embodiment, floor 28 comprises a measurement grid 60 that is part of floor 28 or overlaid onto floor 28. In one aspect, measurement grid 60 enables positioning walls 20, 22, 24, 26 and table 50 relative to each other and relative to a field-of-view 42 of videocamera 40 to achieve a predetermined spaced relationship between these various components. In another embodiment, floor 28 omits positioning grid 60. In addition, in other embodiments, other modular components of environment 10, such as side wall 26, comprise a measurement grid 60, as later described in association with FIG. 4.

In other embodiments, environment 10 including a field-of-view 42 of videocamera 40 is further determined by selecting various parameters of environment 10, as further described in association with FIGS. 3-6.

Figure 2:
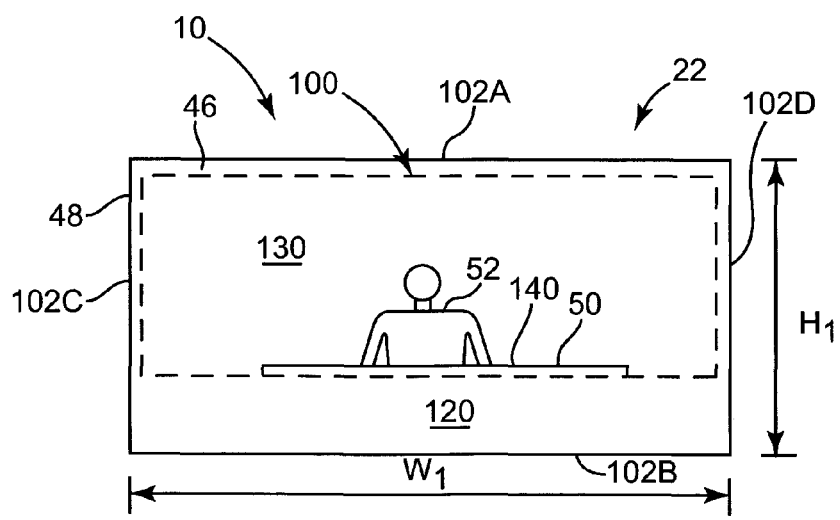
FIG. 2 is a front view of a viewable image producible from a videoconferencing environment, according to an embodiment of the invention.

FIG. 2 is a front view of a viewable area 100 within environment 10, according to an embodiment of the invention. As illustrated in FIG. 2, viewable area 100 corresponds to an image of subject 52 and back wall 22 within a field-of-view 42 of videocamera 40 (on front wall 20) as viewed by a participant in a different location in a reciprocal videoconferencing environment.

In one aspect, back wall 22 comprises peripheral edge 48 that includes top edge 102A, bottom edge 102B, and including side edges 102C, 102D. In one embodiment, viewable area 100 is defined by field-of-view 42 (of FIG. 1) of videocamera 40, as part of the criterion of the environment, and intentionally omits peripheral edge 48 of back wall 22. By restricting the field-of-view 42 to omit peripheral edge 48, the viewing participant does not see the side edges 102C, 102D, top edge 102A, or bottom edge 102B of wall 22 and therefore does not see any corners associated with a junction of back wall 22 and side walls 24, 26 or a junction of back wall 22 and ceiling 30 (FIG. 1). In one aspect, this arrangement promotes a perception of immediacy between the participants because no obstacle interrupts or disrupts the respective participant's visual impression of being in fully direct communication with the remote participant via the uninterrupted sharing of a common space. In other words, this arrangement achieves the conviction in the participants that they are in the same place and not in different locations.

In another aspect, non-viewable area 120 in FIG. 2 defines the area of back wall 22 that is outside of viewable area 100 and which comprises a portion of an off-camera zone 174 as later described in more detail in association with FIGS. 3-4.

In one embodiment, back wall 22 additionally comprises a substantially homogeneous portion 130 that is at least partially co-extensive or substantially co-extensive with viewable area 100 so that substantially homogeneous portion 130 has substantially the same size and shape as viewable area 100 on back wall 22. This substantially homogenous portion 130 ensures that viewable area 100 defines a substantially consistent color and substantially consistent texture without the presence of distracting props, logos, edges, or other items (e.g., fixtures) within viewable area 100. This arrangement enhances a viewing participant's perception of transparency between the respective participants. In other words, substantially homogeneous portion 130 on back wall 22 encourages the perception that the user is less conscious of the format or medium through which the participants are communicating. With this perception, the participants will tend to act more naturally and be more focused on the subject of the intended communication rather than be distracted by the medium (e.g., a viewing monitor, cart, etc.) through which and in which they are communicating.

In other embodiments, back wall 22 omits substantially homogeneous portion 130 and thereby defines a non-homogeneous surface.

In one aspect, back wall 22 has a height H1 and a width W1 selected relative to a field-of-view parameter and/or an aspect ratio of videocamera 40 (FIG. 1) to further produce the perception of transparency and immediacy. In particular, environment 10 comprises back wall 22 being selected to have an aspect ratio (i.e., a width relative to a height) that substantially matches an aspect ratio of the videocamera 40. This arrangement of videoconference environment 10 defines viewable area 100 with a size and shape that generally corresponds to a size and shape of back wall 22, thereby ensuring that viewable area 100 omits peripheral edge 48 of back wall 22 while otherwise generally maximizing the area of back wall 22 captured within field-of-view 42.

In one embodiment, viewable area 100 includes table 50 or other furniture (e.g., desk, podium, etc). In this arrangement, table 50 establishes a reference point so that subject 52 does not appear to be floating, and associates subject 52 with a familiar object. However, in one aspect, only a small visible portion 140 of table 50 is revealed in viewable area 100 while maintaining subject 52 as the prominent item with in viewable area 100 (i.e., viewable image). In addition, object 50 such as a table enables subject 52 to be in a working environment, for handling papers or props related to the subject of the video communication. In another aspect, station 50 enables subject 52 to feeling more at ease and relaxed to induce a more naturally acting subject 52 before videocamera 40. Accordingly, this arrangement gives the viewer the perception of transparency of the subject relative to the viewer.

Accordingly, as illustrated via FIGS. 1-2, environment 10 provides immediacy and transparency in videoconferencing communications between participants in different locations.

Figure 3:
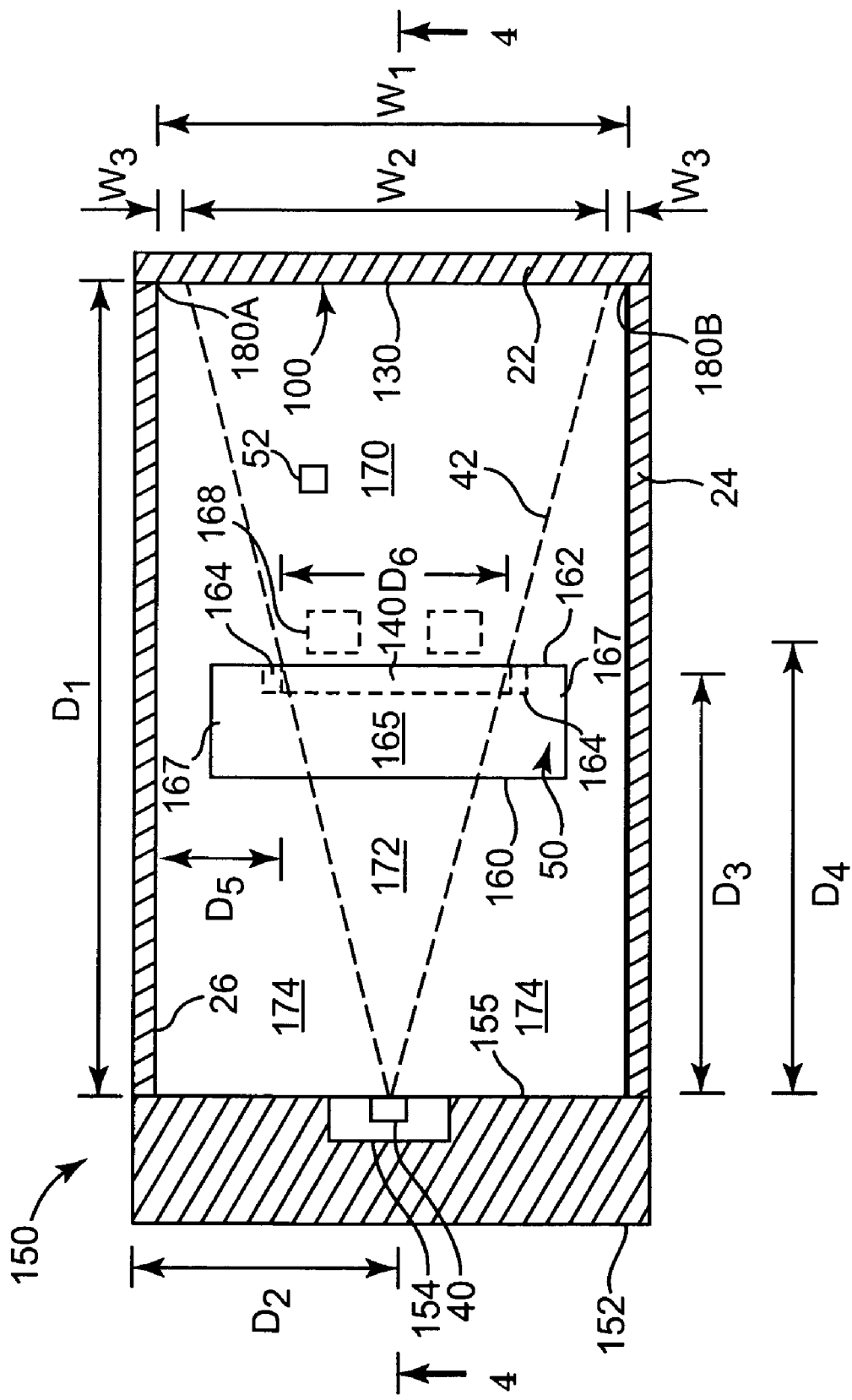
FIG. 3 is a top sectional view of a videoconferencing environment, according to an embodiment of the invention.
Figure 4:
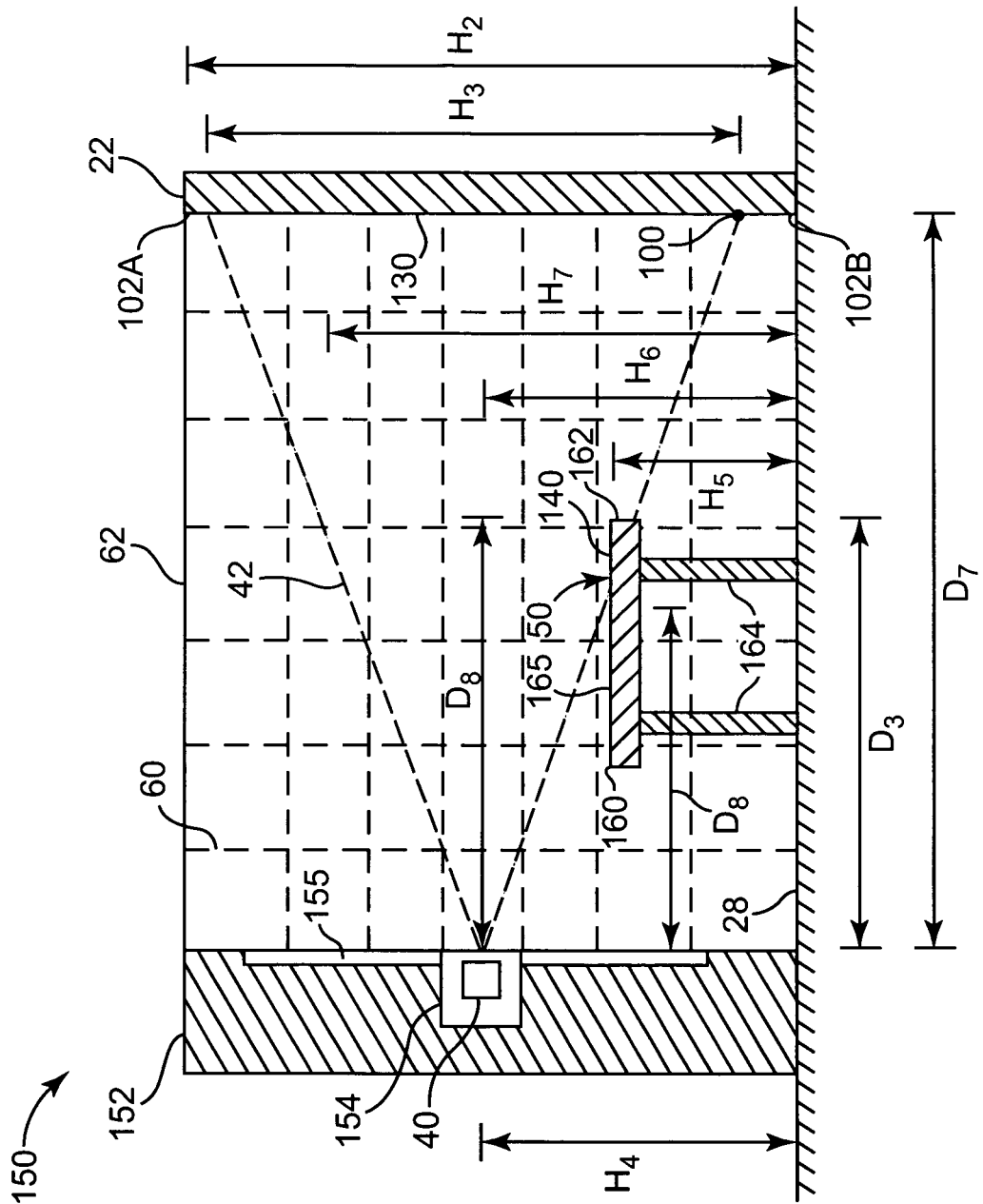
FIG. 4 is a side sectional view of a videoconferencing environment, according to an embodiment of the invention.
Figure 5:
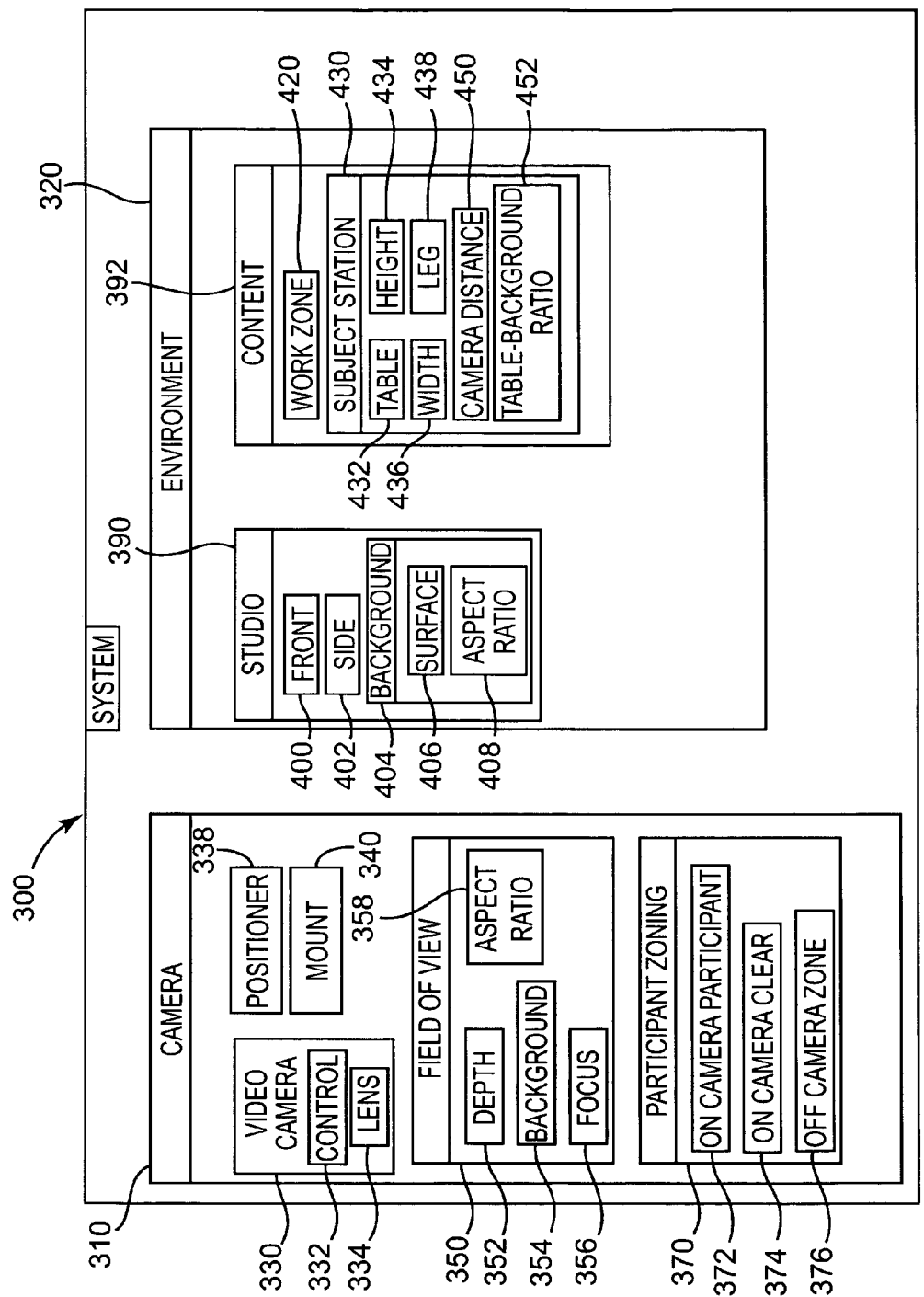
FIG. 5 is a block diagram of a videoconferencing environment system, according to an embodiment of the invention.

FIG. 3 is a top view of a videoconferencing environment 150 according to an embodiment of the invention and FIG. 4 is a side view of a videoconferencing environment 150, according to an embodiment of the invention. FIG. 5 is a block diagram of a videoconferencing system 300, according to an embodiment of the invention. Each of the embodiments associated with FIGS. 3 and 4 are described with reference to the embodiment of FIG. 5. In one embodiment, videoconferencing embodiment 150 comprises substantially the same features and attributes as videoconferencing environment 10, as previously described in association with FIGS. 1-2.

As illustrated in FIG. 3, in one embodiment, videoconference environment 150 comprises back wall 22, side walls 24, 26 and front wall 152 arranged in a generally rectangular pattern. In one aspect, front wall 152 defines cavity 154 for embedding videocamera 40 within front wall 152. In another aspect, videocamera 40 is centered relative to opposite side walls 24, 26 and spaced relative to the respective side walls 24, 26 by a distance D2. In another aspect, front wall 152 comprises screen(s) 155 configured for displaying a viewable image of remote participants reciprocally taking part in a two-way videoconference. In another embodiment, both side walls 24 and 26 of environment 150 are omitted while in another embodiment, only one of side walls 24 and 26 of environment 150 is omitted.

In one embodiment, videoconference environment 150 comprises table 50 which includes visible portion 140, front portion 160, back portion 162, legs 164, top surface 165, and side portions 167. In one aspect, visible portion 140 defines the top surface 165 adjacent back portion 162 that is visible within field-of-view 42.

In one embodiment, videoconference environment 150 comprises a field-of-view 42 of videocamera 40 (relative to a size and shape of walls 22, 24, and 26) that defines an on-camera participant zone 170, an on-camera clear zone 172, and an off-camera zone 174. In one aspect, off-camera zone 174 comprises an area outside field-of-view 42 and therefore not appearing in a viewable image produced by videocamera 40. In another aspect, on-camera clear zone 172 comprises an area within field-of-view 42 that extends from videocamera 40 to table 50 (i.e., subject station) in which videoconferencing environment 150 is free of obstructions. Accordingly, no extraneous items appear in front of subject 52 within the viewable area 100 that would otherwise interrupt the mutual perception of immediacy and transparency between the different sets of differently-located participant(s).

In another aspect, on-camera participant zone 170 defines an area within field-of-view 42 that subject 52 is positioned for substantially continuous appearance and participation (during the videoconference communications) within the viewable image produced by videocamera 40. This participant zone 170 includes a lateral boundary defined by field-of-view 42 as the participant zone 170 extends from visible portion 140 of table 50 (i.e., subject station) to back wall 22. In one aspect, environment 150 comprises markers or other barriers just outside field-of-view 42 at on-camera participant zone 170 to physically limit the movement of a subject 52 to remain within on-camera participant zone 170. In one embodiment, on-camera participant zone 170 includes only visible portion 140 of table 50. In another embodiment, on-camera participant zone 170 comprises additional portions of table 50.

In one embodiment, off-camera zone 174 additionally comprises portions of table 50 other than visible portion 140 and therefore includes front portion 160 of table 50, side portions 167 of table 50, and back portion 162 (outside of legs 164) of table 50.

In one embodiment, videoconference environment 150 physically limits the movement of a subject 52 within on-camera participant zone 170 via legs 164 of table 50. In one aspect, legs 164 of table 50 are spaced by a distance D6 to maintain a seated subject within the lateral boundaries of field-of-view 42 at table 50. In another aspect, physically limiting the movement of subject 52 is accomplished via back portion 162 of table 50 which prevents forward movement of subject 52 outside the on-camera participant zone 170. In another aspect, floor 28 also comprises markings that directly correspond to the lateral boundaries of field-of-view 42 to remind subject(s) 52 of the boundary of the field-of-view 42 and the on-camera participant zone 170.

In one embodiment, table 50 is centered between and spaced from opposite side walls 24, 26 to further ensure the positioning of subject(s) 52 within field-of-view 42. In one aspect, legs 164 of table 50 are spaced from side walls 24, 26 by a distance D5.

In another aspect, the on-camera participant zone 170 of videoconference environment 150 is further defined by back portion 162 of table 50 with table 50 positioned relative to front wall 152 to set back portion 162 of table 50 a distance D3 from videocamera 40. Distance D3 corresponds to a minimum focal distance (distance D4) to ensure that when subject 52 is in on camera participant zone 170 the subject 52 is in focus. As illustrated in FIG. 3, this arrangement places visible portion 140 of table 50 and subject(s) 52 within on-camera participant zone 170. In another embodiment, on-camera participant zone 170 additionally comprises chairs 168 for seating subjects 52 immediately adjacent table 50.

In another aspect, on-camera participant zone 170 of videoconference environment 150 is also defined by a maximum distance of D1 (a length of side wall(s) 24, 26) by virtue of back wall 22 limiting further rearward movement. In one aspect, side wall 26 (and side wall 24) has a length (D1) to ensure that field-of-view 42 of videocamera 40 at back wall 22 generally corresponds to a size and shape of back wall 22 except excluding the peripheral edge 48 of back wall 22 (as previously described in association with FIG. 2).

In one aspect, videoconference environment 150 includes a corner 180A defining a junction between back wall 22 (i.e., a side edge 102C of back wall 22 in FIG. 2) and side wall 26 while corner 180B defines a junction between back wall 22 (i.e., a side edge 102D of back wall 22 in FIG. 2) and side wall 24. As illustrated in FIG. 3, back wall 22 is sized with a width W1 so that a width W2 of field-of-view 42 at back wall 22 is smaller than the width W1 of back wall 22. This arrangement keeps corners 180A, 180B outside of field-of-view 42, thereby enhancing the prominence of subject 52 within the viewable image of the field-of-view 42 (i.e. viewable area 100 in FIGS. 2-3) and enhancing the transparency of videoconference environment 150 as perceived by the participants of a videoconference communication. As further illustrated in FIG. 3, width W3 generally corresponds to a size of border 46 (FIGS. 1-2) between viewable area 100 and peripheral edge 48 of back wall 22.

Accordingly, based on the foregoing environmental criterion for videoconference environment 150, off-camera zone(s) 174 of environment 150 generally corresponds to the areas within environment 150 that a subject 52 is not permitted to be present. In one aspect, off-camera zone(s) 174 comprise all areas within environment 150 other than on-camera participant zone 170 and on-camera clear zone 172. For example, off-camera zone 172 includes corners 180A, 180B of peripheral edge 48 of back wall 22, side portions 167 of table 50, side walls 24 and 26, as well as excluding corners (not shown in FIG. 3) defined by a junction of back wall 22 and a ceiling 30 or a junction of back wall 22 and a floor 28.

As in the prior embodiments, each respective wall 152, 22-26 is removably attachable and removably arrangeable relative to each other so that the environment comprises modular components that are easily assembled and/or disassembled at will for portable use. However, unlike a conventional partition wall, walls 20, 22, 24, 26 operate as unique modules having a particular size and shape selected to enable a reproducible, portable videoconferencing environment 150 configured to achieve transparency and immediacy in the videocommunication between the participants of the videoconference communications.

Accordingly, one need not travel to a conventional dedicated videoconferencing environment to obtain high quality videoconferencing. Instead, one can bring the videoconferencing environment to the desired location. However, this arrangement is much more than the conventional act of wheeling a videoconferencing rack including a camera and related equipment into an existing office or ordinary conference room. In the embodiments of the invention, the entire enclosure (e.g., enclosure 10 in FIG. 1) in which the videoconferencing takes place is portable and set-up within an existing office or ordinary conferencing room to establish and import a controlled videoconferencing environment.

FIG. 4 is a side sectional view of videoconferencing environment 150, according to an embodiment of the invention. As in FIG. 3, FIG. 4 illustrates videoconference environment 150 comprising front wall 152 with videocamera 40, back wall 22, and table 50 arranged to define field-of-view 42.

As further illustrated in FIG. 4, in one aspect field-of-view 42 of videoconference environment 150 excludes top edge 102A and bottom edge 102B of back wall 22, thereby maintaining the exclusion of peripheral edge 48 of back wall 22 from field-of-view 42. Accordingly, videoconference environment 150 produces viewable area 100 on back wall 22 that excludes any portion of sidewall 24, 26, floor 28, or ceiling 30 (FIG. 1) from field-of-view 42 and therefore excludes those components from on-camera participant zone 170.

In one embodiment, as illustrated in FIG. 4, videocamera 40 is mounted within wall 152 and spaced from floor 28 by a distance H4 with distance H4 selected to ensure that a height (H6) of a seated subject and/or a height (H7) of a standing subject are both within field-of-view 42. In another aspect, both distance H4 of videocamera 40, and height H5 of table 50 are selected to position visible portion 140 adjacent back portion 162 of table 50 within field-of-view 42 when back portion 162 of table 50 is generally positioned adjacent minimum focal distance D3. In one aspect, distance D8 corresponds to a distance between front wall 152 and a beginning edge of visible portion 140 of table 50. In another aspect, as illustrated in FIG. 4, back wall 22 is provided with a height H2 greater than a vertical length H3 of field-of-view 42 at back wall 22.

In another embodiment, as illustrated in FIG. 4, videoconferencing environment 150 includes measurement grid 60 overlaid onto or formed within side wall 26. In one aspect, the measurement grid 60 comprises uniformly spaced markings 62 arranged in series along a dimension (e.g., a width, length, height) of the respective modular wall to enable proper placement of table 50 in position between front wall 152 and back wall 22. Because the field-of-view 42 excludes sidewall 26 from viewable area 100, in one embodiment sidewall 26 defines a permanent, visible grid 60 enhancing proper positioning within environment 150 without compromising the transparency of videoconference environment 150 achieved within field-of-view 42. In another embodiment, a measurement grid 60 is temporarily affixed to any one of the respective modular walls or floor 28 (as in FIG. 1) to assist defining the on-camera participant zone 170, on-camera clear zone 172 and off-camera zone(s) 174.

FIG. 5 is a block diagram of a videoconferencing system 300, according to an embodiment of the invention. In one embodiment, videoconferencing system 300 represents a physical system of modular elements arrangeable in a preset configuration as illustrated in FIGS. 1-4. In another embodiment, videoconferencing system 300 represents a software system including an array of various parameters manipulable to enable determining a pattern for arranging a corresponding physical system of modular elements (e.g., walls, camera, subject, etc.). Accordingly, the terms module and parameter as described in association with FIG. 5 refer to a physical element and/or a representation of a physical element (or physical relationship) as expressed in software, hardware, or other electronic formats.

As illustrated in FIG. 5, videoconferencing system 300 comprises a camera module 310 and an environment module 320. In one embodiment, camera module 310 comprises parameters and relationships relating to a videocamera (e.g., videocamera 40 in FIGS. 1-4) while environment module 320 comprises parameters and relationships relating to an environment including various components such as walls (e.g., walls 20, 22, 24, 26) and table 50. Together, camera module 310 and environment module 320 enable consistent operation of a videoconferencing environment in a portable, reproducible form to facilitate high quality videoconferencing.

In one embodiment, camera module 310 comprises videocamera 330 with controls 332 and lens 334, along with positioner 338 and mount 340. Controls 332 enables selection of conventional camera parameters (e.g., focus, framing, iris, exposure time, etc.), some of which are parameters relating to and forming a portion of the field-of-view module 350 described later. In another aspect, positioner 338 of camera module 310 enables control over tilt, pan, and roll factors of videocamera 330 to facilitate setting a field-of-view within a videoconferencing environment. Mount 340 enables mounting videocamera 330 on or within a front wall (e.g., front wall 152 in FIGS. 3-4).

In another aspect, camera module 310 additionally comprises field-of-view module 350 and participant zoning module 370. In one aspect, field-of-view module 350 comprises depth parameter 352, background parameter 354, and focus parameter 356, which enable and control the quality of imaging in environment according to video techniques. In another aspect, aspect ratio parameter 358 of field-of-view module 350 corresponds to an aspect ratio of videocamera 330 and is selected or set to insure substantially matching relative to an aspect ratio of a back wall (e.g., back wall 22) of environment 10 (see FIGS. 1-4). For example, in one aspect, videocamera 330 (such as videocamera 40) is selected or set to have an aspect ratio of 16:9, and then back wall 22 is also selected or set to have a size and shape with an aspect ratio of 16:9 so that the field-of-view 42 of videocamera 330, when spaced from back wall 22 by an predetermined distance, corresponds to the size and shape of back wall 22. This matching of aspect ratios ensures that a viewable image within the field-of-view as seen by the participants is substantially free of discontinuities associated with a peripheral edge of the background wall of the videoconference environment.

In one aspect, participant zoning module 370 comprises on-camera participant zone parameter 372, on-camera clear zone parameter 374, and off camera zone parameter 376. In one aspect, participant zoning module 370 identifies and controls the relative size and spacing of the respective on-camera and off-camera parameters 372-376. In one aspect, on-camera participant zone parameter 372 identifies an area (e.g., on-camera participant zone 170 in FIG. 3) in which a subject remains within a field-of-view (e.g. field-of-view 42) and in which a viewable image evokes a perception of transparency between the participants of the videoconferencing communication. In another aspect, on-camera clear zone parameter 374 identifies an area (e.g., on-camera clear zone 172 in FIG. 3) within a field-of-view (e.g., field-of-view 42 in FIGS. 1-4) between a subject station (e.g., table 50) and a videocamera 330 (e.g. videocamera 40 in FIGS. 1-4) in which no obstructions are permitted. In another aspect, off camera zone parameter 376 identifies and sets an area (e.g., off-camera zone 174 in FIG. 3) outside the field-of-view (e.g. field-of-view 42) of a videocamera in which the subject will not be permitted to be present.

As illustrated in FIG. 5, videoconference system 300 also comprises environment module 320 which operates in association with camera module 310 to create a videoconferencing environment that produces immediacy and transparency in videoconference communications between participants in different locations. In one embodiment, environment module 320 comprises studio module 390 and content module 392. In one aspect, studio module 390 comprises parameters that control a size and shape of a booth, enclosure or studio in which the videoconference communication takes place. In one aspect, studio module 390 comprises front wall parameter 400, side wall(s) parameter 402, and background wall parameter 404. Via parameters 400-404, studio module 390 identifies and controls the size and shape of the respective front wall, side walls, and back wall, as well as the distance between the respective front wall and back wall and the distance between the opposite side walls. As previously described in association with FIGS. 1-5, these parameters are selected to define the field-of-view of videocamera relative to the videoconferencing environment.

In one embodiment, background wall parameter 404 additionally comprises background surface parameter 406 and aspect ratio parameter 408. Background surface parameter 406 identifies and controls the type and size of the surface visible on a background wall (e.g., back wall 22 in FIGS. 1-4), such as whether background wall comprises a substantially homogenous surface or includes various thematic elements, props, etc. In one aspect, a substantially homogeneous surface (such as substantially homogeneous portion 130 in FIG. 2) is one generally lacking any substantial discontinuities (e.g., abrupt changes in contrast, conspicuous gaps, etc). In one aspect, aspect ratio parameter 408 identifies and/or controls an aspect ratio of a background wall (e.g., back wall 22 in FIGS. 1-4) via selection of the size and shape of the background wall relative to an aspect ratio of a videocamera according to aspect ratio parameter 358 for the videocamera.

In one embodiment, environment module 320 also comprises a content module 392 for identifying and/or controlling a position of a subject and a subject station within the videoconferencing environment. In one aspect, content module 392 comprises work zone parameter 420 and subject station module 430. Work zone parameter 420 identifies any special lighting, sound, and/or other requirements for on-camera participant zone 170 (FIGS. 3-4). In one aspect, subject station module 430 comprises table parameter 432, height parameter 434, width parameter 436, leg parameter 438, camera distance parameter 450, and table-background ratio parameter 452. In another aspect, table parameter 432 identifies and/or controls whether a table or other subject station is included in a field-of-view (e.g., field-of-view 42 in FIGS. 1-4) and within on-camera participant zone (e.g., participant zone 170). In addition, a height and width of a table are identified and selected, according to height parameter 434 and width parameter 436 of subject station module 430, to achieve a field-of-view 42 that includes a portion of table 50 in front of a subject 52, as previously described in association with FIGS. 1-4.

In another embodiment, leg parameter 438 of subject station module 430 of system 300 identifies and controls a position of legs 168 of a table 50 (FIGS. 3-4) for physically limiting a lateral range of movement of a subject 52 to force the subject 52 to remain within field-of-view 42 when seated at table 50 and thereby within on-camera participant zone 170 (FIGS. 3-4). Moreover, in another aspect, a position of legs 164 of table 50 are also aligned with the lateral edges of field-of-view 42 in FIGS. 3-4, and therefore a leg parameter 438 is selectable to determine a lateral dimension of field-of-view 42 of the camera 40 at table 50 (e.g., a subject station).

In one embodiment, a camera distance parameter 450 identifies and controls a distance that a subject station, such as a table 50, is set away from a videocamera and in most instances, this camera distance parameter 450 is set to correspond to a minimum focal distance of the videocamera.

In another embodiment, subject station module 430 comprises a table-background ratio parameter 452 that identifies and/or controls substantially matching between a width of the subject station (e.g. table 50 in FIGS. 1-4) and a width of the background wall so that the width of the subject station generally fills the field-of-view in a lateral dimension at the subject station and the width of the background wall generally fills the field-of-view at the position of the back wall.

In addition, system 300 is not limited exclusively to the parameters shown in FIG. 5, as the various additional relationships expressed in FIGS. 1-5 also represent parameters of a videoconferencing environment of embodiments of the invention.

Figure 6:
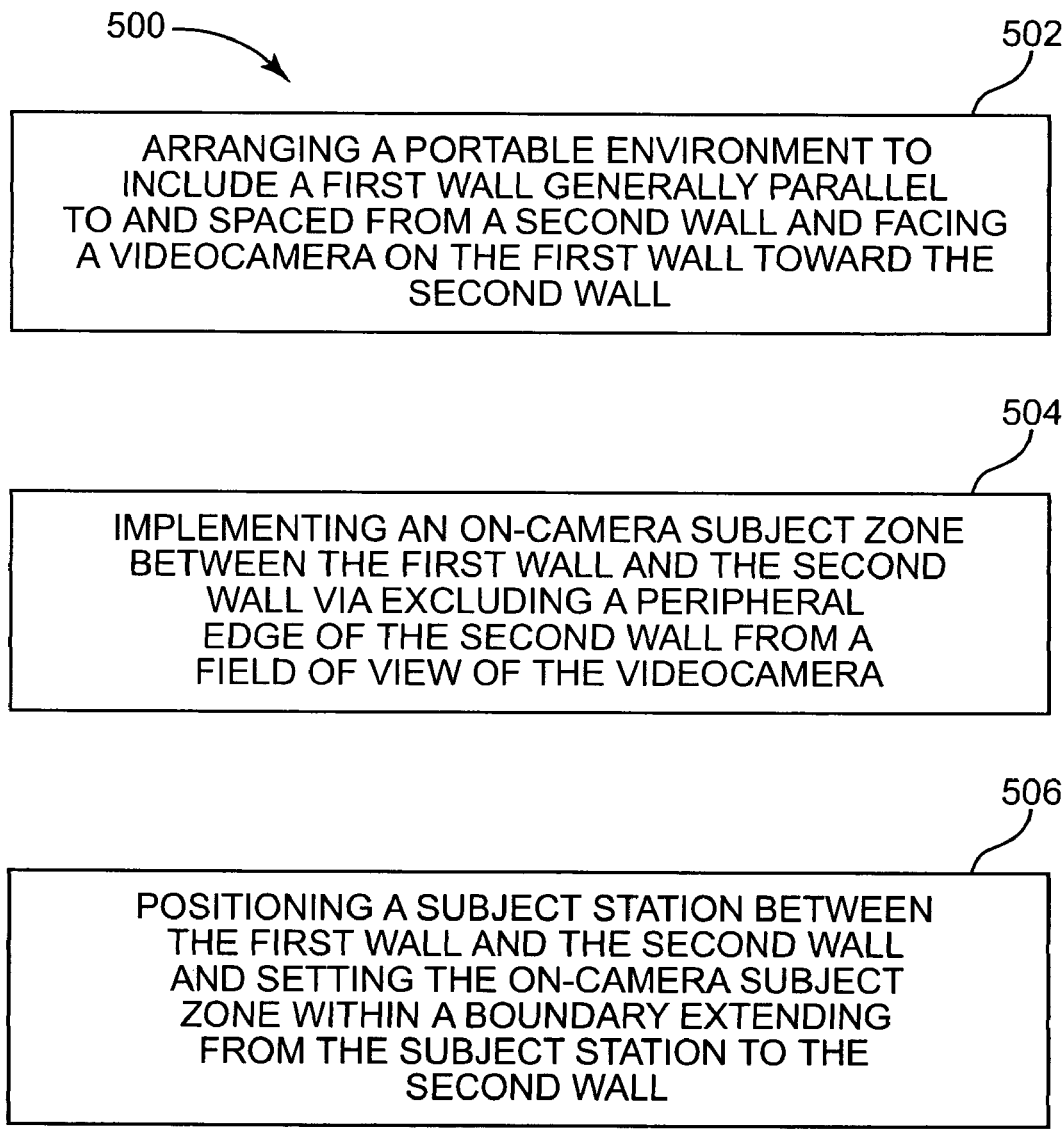
FIG. 6 is a flow diagram of a method of videoconferencing, according to an embodiment of the invention.

FIG. 6 is a flow diagram of a method 500 of preparing a videoconferencing environment, according to an embodiment of the invention. In one embodiment, method 500 is performed via use of videoconferencing environments described in association with FIGS. 1-5, while in other embodiments, method 500 is performed via use of other videoconferencing environments.

As illustrated at 502 in FIG. 6, method 500 comprises arranging the portable environment to include a first wall generally parallel to and spaced from a second wall and facing a videocamera on the first wall toward the second wall. At 504, the method comprises implementing an on-camera subject zone between the first wall and the second wall via excluding a peripheral edge of the second wall from a field-of-view of the videocamera. This implementation is also accomplished, as shown at 508, via positioning a subject station between the first wall and the second wall and setting the on-camera subject zone within a boundary defined by the field-of-view of the camera extending from the subject station to the second wall.

In one aspect, method 500 comprises additional aspects in accordance with the various components of videoconference environments, as previously described in the embodiments in association with FIGS. 1-5.

Embodiments of the present invention are directed to promoting immediacy and/or transparency in videocommunications by carefully identifying parameters that determine a field-of-view and controlling those parameters to provide a substantially similar environment for each participant and limiting the viewable image to exclude items, geometries, or junctions that would otherwise impede the viewers focus on the participants of the videoconferencing communication.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of preparing a videoconference environment, the method comprising:
    arranging a portable environment to include a first wall generally parallel to and spaced from a second wall and facing a videocamera on the first wall toward the second wall; and
    implementing an on-camera subject zone between the first wall and the second wall via:
        setting a field-of-view of the videocamera relative to a first distance between the first wall and the second wall and relative to a size and shape of the second wall to cause the field-of-view of the videocamera to include the second wall while excluding a peripheral edge of the second wall; and
        positioning a subject station between the first wall and the second wall and setting the on-camera subject zone within a boundary defined by the field-of-view of the videocamera extending from the subject station to the second wall.

2. The method of claim 1 wherein arranging the environment comprises:
    substantially matching a first aspect ratio parameter of the videocamera and a second aspect ratio parameter of the second wall.

3. The method of claim 1 wherein arranging the environment comprises:
    defining the second wall as a substantially homogeneous surface.

4. The method of claim 1 wherein implementing an on-camera subject zone includes physically limiting movement of a subject to remain within the boundary of the on-camera subject zone and positioning the subject station adjacent a second distance from the first wall, the second distance corresponding to a minimum focal distance of the videocamera.

5. The method of claim 4 wherein positioning the subject station comprises:
    providing a table as the subject station and locating a back portion of the table substantially adjacent the second distance from the first wall.

6. The method of claim 5 wherein positioning the subject station comprises:
    providing the table with a width substantially the same as a width of the selected field-of-view parameter of the videocamera at the second distance from the first wall.

7. The method of claim 6 wherein providing the table comprises:
    providing the table according to a table-to-background aspect ratio in which a third aspect ratio parameter of the table substantially matches the second aspect ratio parameter of the second wall.

8. The method of claim 6 wherein providing the table comprises:
    providing the table with a pair of rear legs of the table spaced apart at opposite ends of the table with each respective rear leg adjacent a side edge of the field-of-view of the videocamera and adjacent the second distance from the first wall; and
    limiting lateral movement of the subject adjacent the table to remain between the rear legs of the table.

9. The method of claim 4 wherein implementing the on-camera subject zone comprises:
    setting the second distance between the first wall and the subject station and setting a height of a back portion of the table to cause the viewable image from the videocamera to include the back portion of the table and exclude other portions of the table.

10. The method of claim 1 wherein implementing the on-camera subject zone comprises:
    implementing an on-camera clear zone between the videocamera at the first wall and the subject station and an off-camera zone outside the field-of-view of the camera between the first wall and the second wall.

11. The method of claim 1 wherein arranging the environment comprises:
    removably arranging at least one side wall to extend between the first wall and the second wall; and
    arranging a width of the second wall, relative to the field-of-view parameter of the videocamera and the first distance, to exclude the at least one side wall from the field-of-view of the videocamera adjacent the second wall.

12. The method of claim 1, wherein setting the field-of-view of the videocamera comprises:
    setting the field-of-view of the videocamera to cause the field-of-view of the videocamera to include the second wall while excluding all the peripheral edges of the second wall.

13. A portable videoconferencing environment comprising:
    an enclosure including:
        an array of walls including a front wall, at least one side wall, and a back wall, the front wall and the back wall being removably attachable, respectively, relative to the at least one side wall to position the front wall generally parallel to and spaced from the back wall with the at least one side wall generally perpendicular to the respective front wall and back wall;
        a subject zone extending at least partially between the front wall and the back wall; and
        a videocamera mounted within the front wall and facing the back wall, the videocamera having a first field-of-view parameter dimensioned relative to a length of the at least one side wall and to an area of the back wall to define a field-of-view at the back wall that excludes the at least one side wall and excludes a junction of the back wall and the at least one side wall.

14. The portable videoconferencing environment of claim 13 wherein the videocamera has a first aspect ratio and the back wall defines a second aspect ratio with the first aspect ratio substantially matching the second aspect ratio.

15. The portable videoconferencing environment of claim 13 wherein the back wall defines a substantially homogenous surface that is sized and shaped to substantially match a size and a shape of the second field-of-view of the back wall.

16. The portable videoconferencing environment of claim 13 wherein the enclosure defines an on-camera participant zone, an on-camera clear zone, and an off-camera zone, wherein the on-camera participant zone is co-extensive with the field-of-view and is spaced from the videocamera by at least a focal distance of the videocamera relative to the front wall, wherein the on-camera clear zone extends between the videocamera and the on-camera participant zone and the on-camera clear zone excluding any objects.

17. The portable videoconferencing environment of claim 13 wherein the at least one side wall comprises a measurement grid configured to determine relative spacing between the front wall, the back wall, and the subject station.

18. A modular videoconferencing system comprising:
a portable booth having a front wall and a back wall generally parallel and spaced from each other, the portable booth defining a subject station between the front wall and the back wall, the back wall including a peripheral edge; and
a videocamera mounted on the front wall and facing the back wall, wherein the videocamera and the portable booth are arranged according to an environment criterion comprising:
an aspect ratio parameter in which a first aspect ratio of the back wall is selected to substantially match a second aspect ratio of the videocamera; and
a field-of-view parameter in which a field-of-view of the videocamera, relative to a distance between the front wall and the back wall, is set to include at least a portion of the subject station and a surface of the back wall while excluding the peripheral edge of the back wall.

19. The modular videoconferencing environment system of claim 18 wherein portable booth comprises at least one side wall extending from the front wall to the back wall and wherein the field-of-view parameter of the environment criterion is set to exclude the at least one side wall from the field-of-view of the camera.

20. The portable videoconferencing environment system of claim 18 further comprising wherein the subject station comprises a table, the table defining a width extending generally parallel to the front wall and the back wall, wherein the environment criterion comprises a table-back wall ratio parameter in which an aspect ratio of the table substantially matches an aspect ratio of the back wall.

21. The portable videoconferencing environment system of claim 18 wherein the environment criterion comprises an on-camera subject zone defining a longitudinal parameter substantially equal to an area between the subject station and the back wall and a lateral parameter substantially equal to a width of the field-of-view as the field-of-view extends between the subject station and the back wall.

* * * * *